United States Patent Office 3,441,688
Patented Apr. 29, 1969

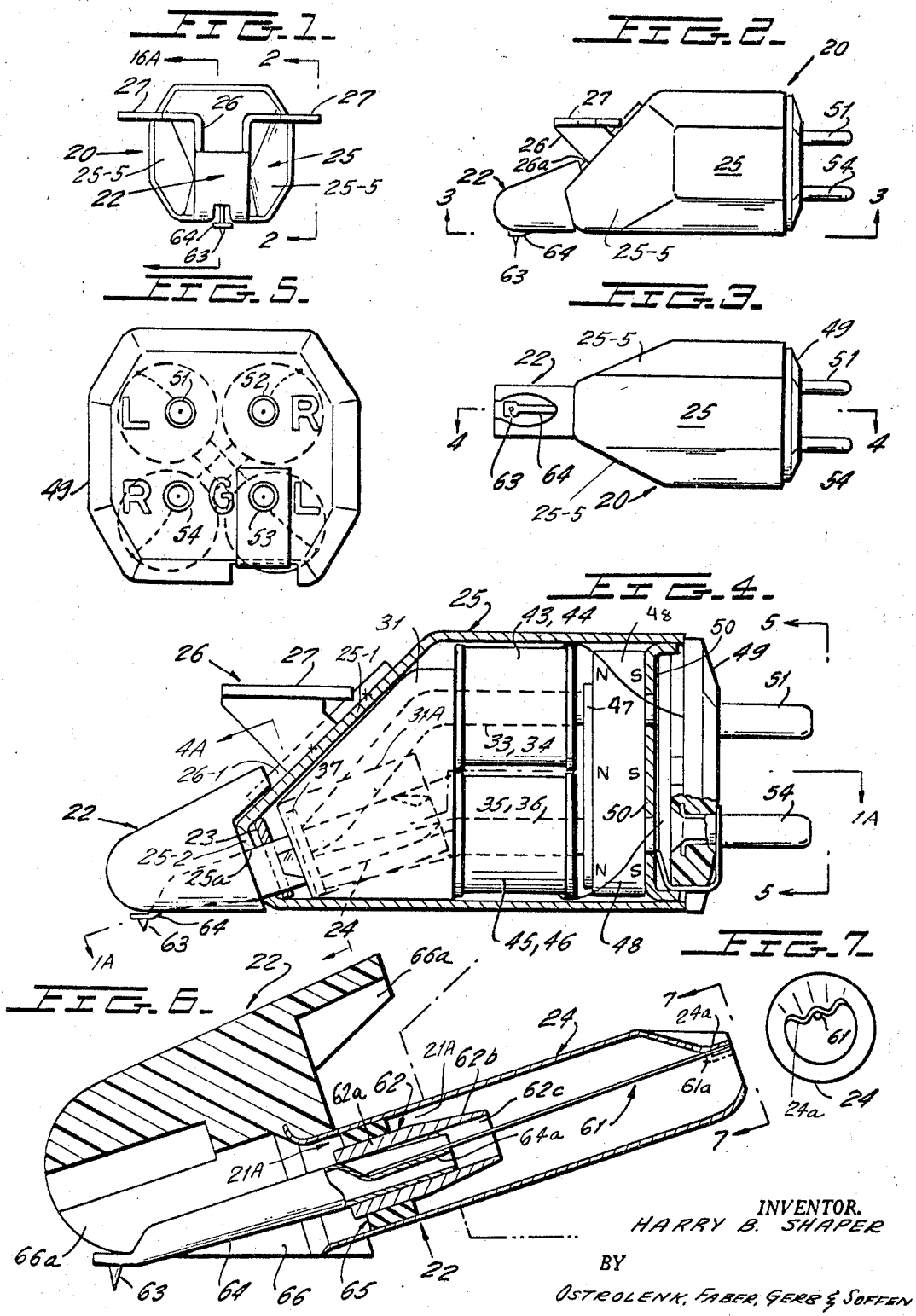

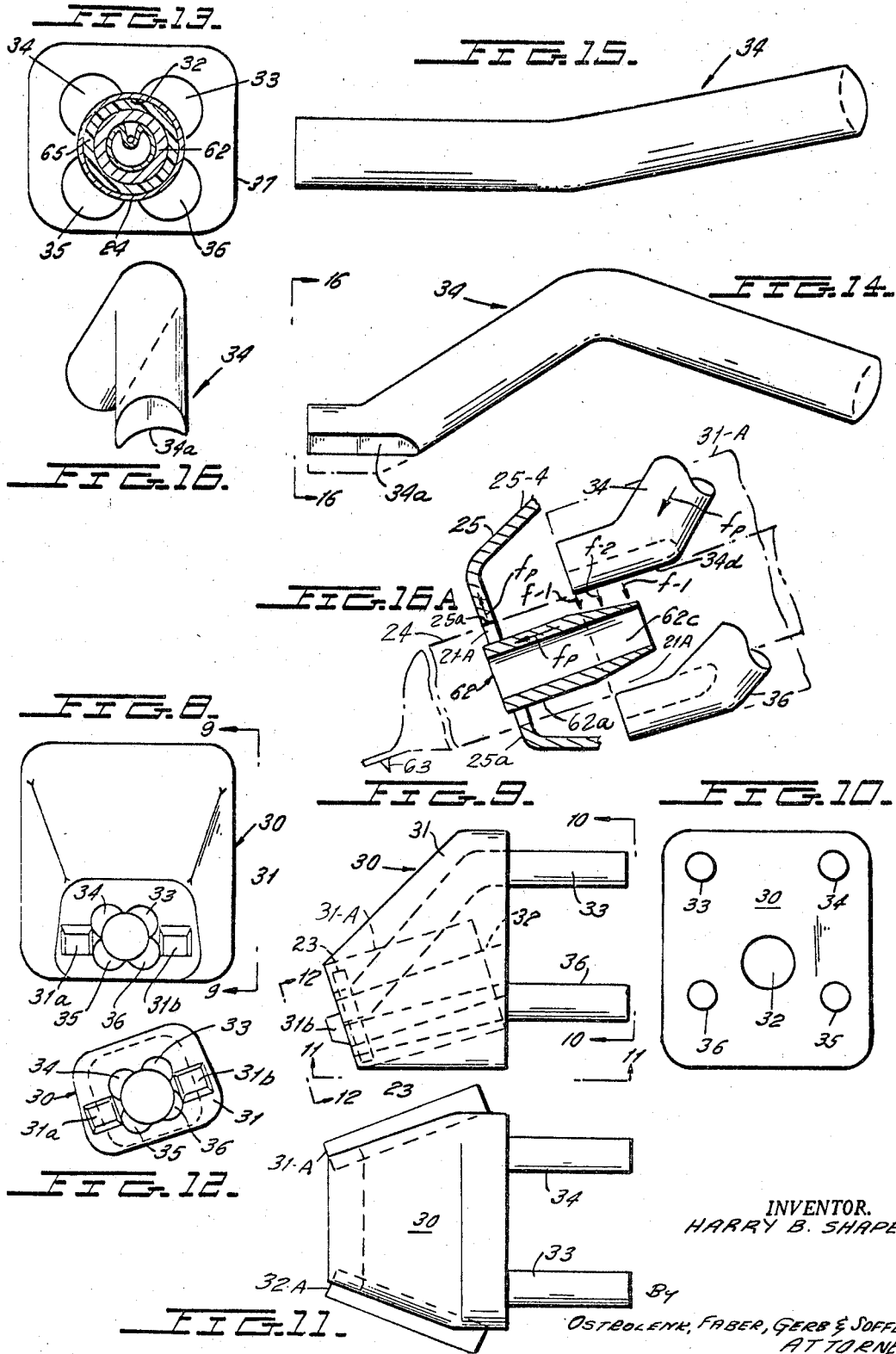

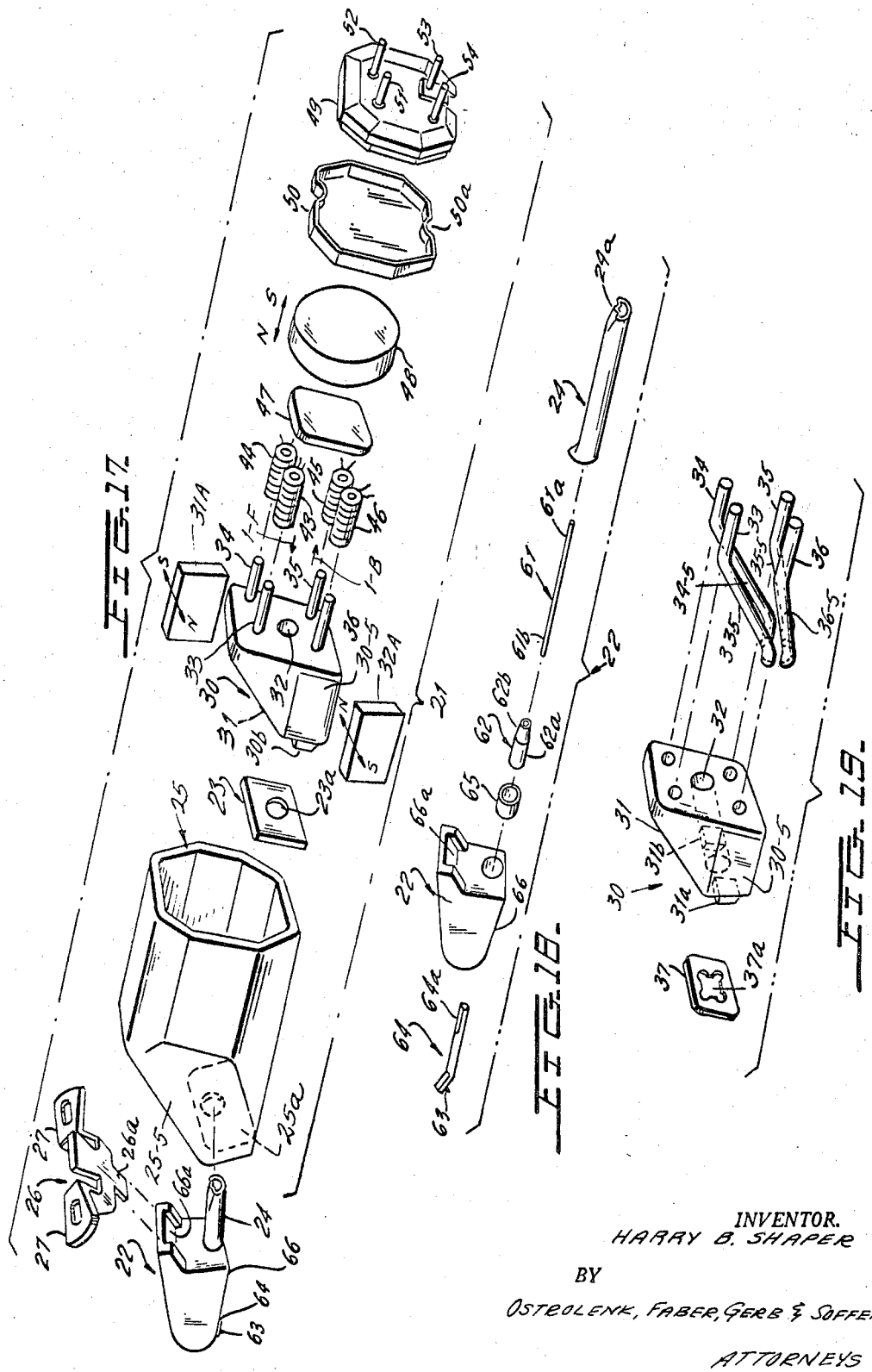

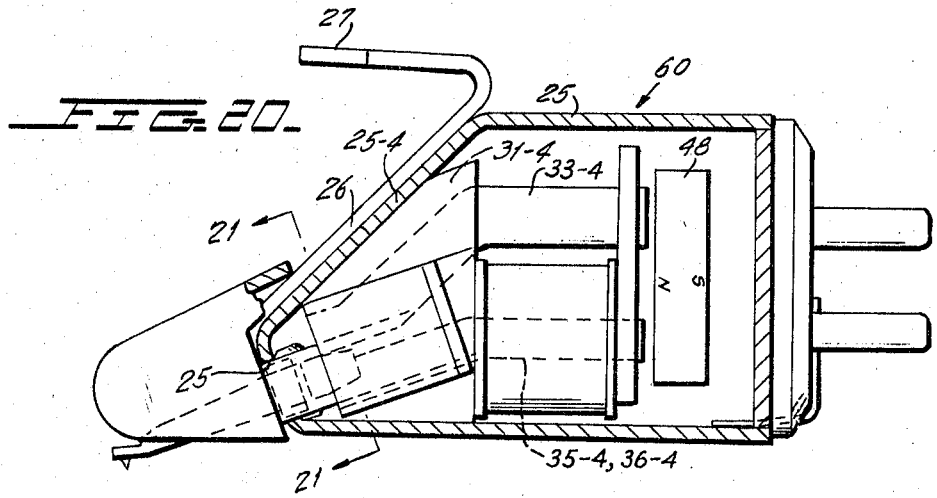
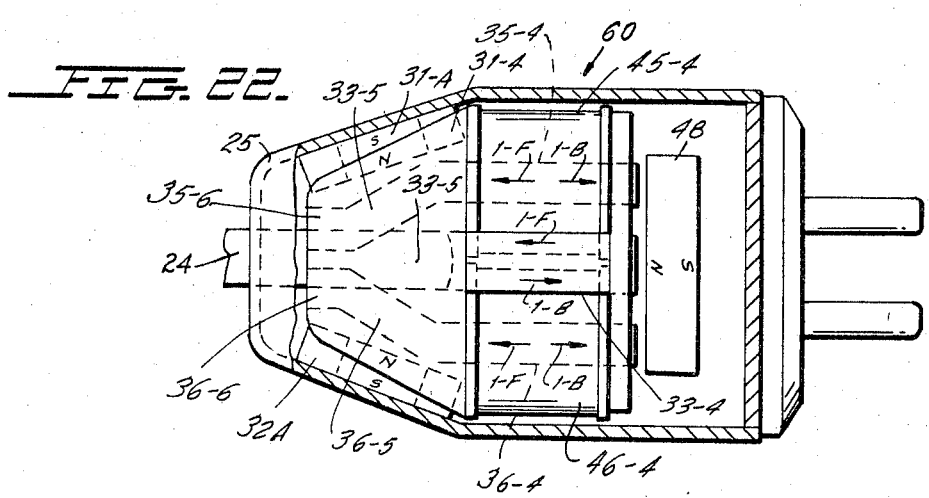
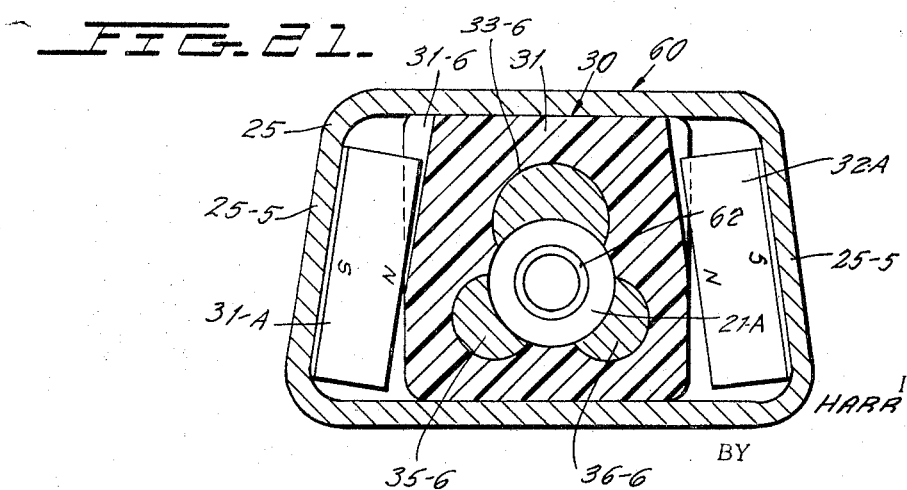

3,441,688
ELECTROMAGNETIC PHONOGRAPH PICKUP
CARTRIDGES WITH ZERO BALANCED
ARMATURE FLUX
Harry B. Shaper, East Hills, N.Y., assignor to Empire
Scientific Corporation, Garden City, N.Y., a corporation of New York
Filed Apr. 18, 1966, Ser. No. 543,136
Int. Cl. H04r 1/16, 9/12, 11/08
U.S. Cl. 179—100.41    12 Claims This invention relates to electromagnetic phonograph cartridges of the stereophonic and of the monophonic type, each operated by the undulations of a stylus engaging and driven by undulations of the record groove. Specifically, it relates to electromagnetic pickups having a stylus undulated permeable magnetic armature and is held in the air gap of winding interlinked magnetic core structure having a permanent magnet which forces a strong permanent magnet field flux through the core and air gap. Undulations of the stylus drive armature cause corresponding flux fluctuations of the core field flux and generate corresponding output signals in the core windings. Such pickups are widely used in high-fidelity phonograph apparatus for playing back high-fidelity disc-type records of music and the like. Each such high-fidelity pickup is provided with a high permeability magnetic shield enclosure which exposes only the armature-stylus arm with its stylus. The strong permanent magnet flux field of such pickup causes difficulties due to excessive leakage flux at the region of the undulated armature. The strong permanent magnet flux also gives such pickup excessive microphonic sensitivity to vibration disturbances and mechanical shocks, thereby greatly disturbing and limiting its operation.

As used herein in the specification and claims, the following definitions shall apply:

"permeable" body means a magnetic body having the ability to readily pass magnetic field lines or flux in either direction under an applied magnetomotive force;
"magnetic flux" means the total magnetic flux lines of flux passing through a body or space; and
"permanent magnet" means a magnetic body which after being magnetized remains magnetized in a selected direction and exerts a magnetomotive force enabling it to force a magnetic flux through space and/or magnetic bodies.

Among the objects of the invention is an electromagnetic pickup of the foregoing type with a magnetic core so magnetized by a strong permanent magnet wherein the difficulties due to excessive leakage flux at the armature are suppressed or minimized; and such type electromagnetic pickup wherein the monophonic difficulties due to vibrations, shocks and the like are suppressed or minimized.

The foregoing and other objects of the invention are achieved, among others, by examples of pickups of the invention described below. As an example of a monophonic pickup, it is formed of a magnetic core having two core poles with pole ends having pole faces spaced apart by an air gap. A permanent magnet remote from the pole ends, which may form part of the core or a core pole, forces a strong unidirectional magnetic field flux through the two core poles and the air gap, with at least one core pole being formed of permeable material. A permeable magnetic shield is spaced apart from the pole ends and surrounds the air gap region and at least the major part of the core poles. A permeable magnetic armature is held in a neutral air-gap position and is undulated by the stylus motion causing corresponding undulations of the field flux in the core path of the two poles for generating corresponding signals in core-interlinked windings.

At least one (or two) balancing permanent magnet is held between the two pole ends and the surrounding magnetic shield to force through the core path of the two poles balancing opposing flux which reduces the remote magnet field flux to a balanced near zero flux state while the armature remains in its neutral position. However, undulations of the armature toward and/or away from the two nearby pole faces upsets the near zero flux state in the two-pole core path and causing corresponding large field flux undulations therethrough and generation of a high corresponding signal output in the pole or core path windings.

A stereophonic pickup of the invention combines two at least partially distinct double-pole cores of the just described monophonic pick-up, each having its own distinct winding, with a common air gap defined by their two pairs of confronting poles. The armature is undulated by the stylus along either one of two distinct mutually transverse core paths between the respective two pairs of confronting pole faces. A permanent field magnet and at least one opposite permanent balancing magnet are held along opposite end regions of the core pole assembly as in the monophonic pickup for maintaining in each distinct double-pole core path a balanced near zero flux state in the neutral armature position. However, stylus transmitted armature undulations of the neutrally biased armature along either one of the two distinct air gap paths will similarly upset the near zero flux state of the respective core paths, causing corresponding large field flux undulations therethrough and generating a corresponding high signal output in its winding.

In a further example of a stereophonic pickup of the invention, a core structure combines two distinct core paths, each having a winding interlinked distinct pole member having a pole-end pole face with a common further pole member having a common pole-end pole face defining with the two distinct pole-member faces a common air gap with two distinct transverse gap paths for each distinct core path. A permanent magnet and at least one opposing balancing permanent magnet produce in each of the core paths opposing fluxes which maintain a near zero flux state in each distinct core path as long as the stylus actuate armature remains biased in the neutral air gap position. As in the other stereophonic pickup, the mutually transverse components of the composite stylus motion imparted to the armature from the neutral position will similarly unbalance the near zero flux state in the respective distinct pole member core path causing corresponding large undulations of their respective distinct field flux and generations of corresponding signal outputs in their respective distinct-core-path windings.

The foregoing and other objects of the invention and its principles will be best understood from the following description of specific examples thereof in conjunction with the enclosed drawings wherein:

FIG. 1 is a front elevation of one example of a stereophonic phonograph pickup cartridge constructed in accordance with and based on the principles of the invention;

FIG. 2 is a side elevation of the pickup of FIG. 1 seen along arrows 2—2 thereof;

FIG. 3 is a bottom view of the same pickup along arrows 3—3 of FIG. 2;

FIG. 4 is an enlarged longitudinal partially cross-sectional view thereof along arrows 4—4 of FIG. 3;

FIG. 5 is a rear elevation view thereof along arrows 5—5 of FIG. 4;

FIG. 6 is an enlarged longitudinal cross-section of the removable and replaceable stylus assembly of the stereophonic pickup seen in FIGS. 1 and 2 through 5;

FIG. 7 is a rear view of the stylus assembly sleeve along arrows 7—7 of FIG. 6;

FIG. 8 is a front elevation view of the assembly of the four pickup pole pieces partially enclosed by an encapsulating member;

FIG. 9 is a side elevation view of the pole-piece assembly along arrows 9—9 of FIG. 8;

FIG. 10 is a rear elevation view thereof along arrows 10—10 of FIG. 9;

FIG. 11 is a bottom elevation thereof along arrows 11—11 of FIG. 9;

FIG. 12 is a partial front elevation thereof along arrows 12—12 of FIG. 9;

FIG. 13 is an enlarged view of the same pole-piece assembly along arrows 12—12 of FIG. 9 showing in cross-section the relation between pole faces of the pole-piece assembly with the removable stylus assembly held in operating position therein;

FIG. 14 is a side elevation of one of the pole pieces with the pole face at its pole end;

FIG. 15 is a plan elevation of the same FIG. 14 pole piece;

FIG. 16 is a front elevation of the same pole piece along arrows 16—16 of FIG. 14;

FIG. 16A is a partial longitudinal cross-section of the pickup of FIGS. 1 and 2 through 7 showing the relation of the pole pieces of one playback or reproduction channel to the stylus undulated armature and the surrounding portion of the magnetic shield housing;

FIG. 17 is an exploded perspective view of the main components of the sterophonic phonographic pickup cartridge of FIGS. 1 through 5;

FIG. 18 is a similar exploded perspective view of the removable and replaceable stylus assembly seen in FIG. 6;

FIG. 19 is an exploded perspective view of the pole piece assembly seen in FIGS. 8 through 13;

FIG. 20 is a view similar to FIG. 4 of a modified form of stereophonic pickup showing the relation of the main cooperating component of further example of the invention;

FIG. 21 is a cross-sectional view of the same pickup along arrows 21—21 of FIG. 20; and FIG. 22 is a partially elevational and cross-sectional view of the pickup of FIGS. 20 and 21.

Figure 1A:
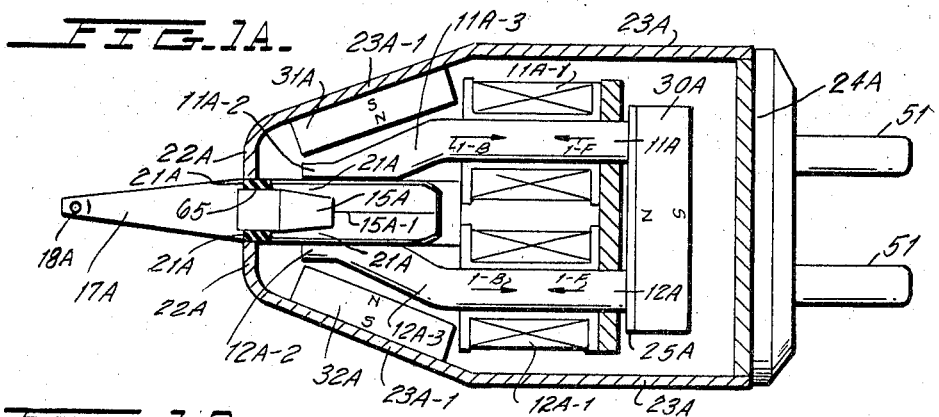
FIG. 1A is a diagrammatic view showing the cooperation of the principal parts of a monophonic pickup based on the invention, the view corresponding to a cross-sectional view along lines 1A—1A of the stereophonic pickup in FIG. 4 or FIG. 20.
Figure 1B:
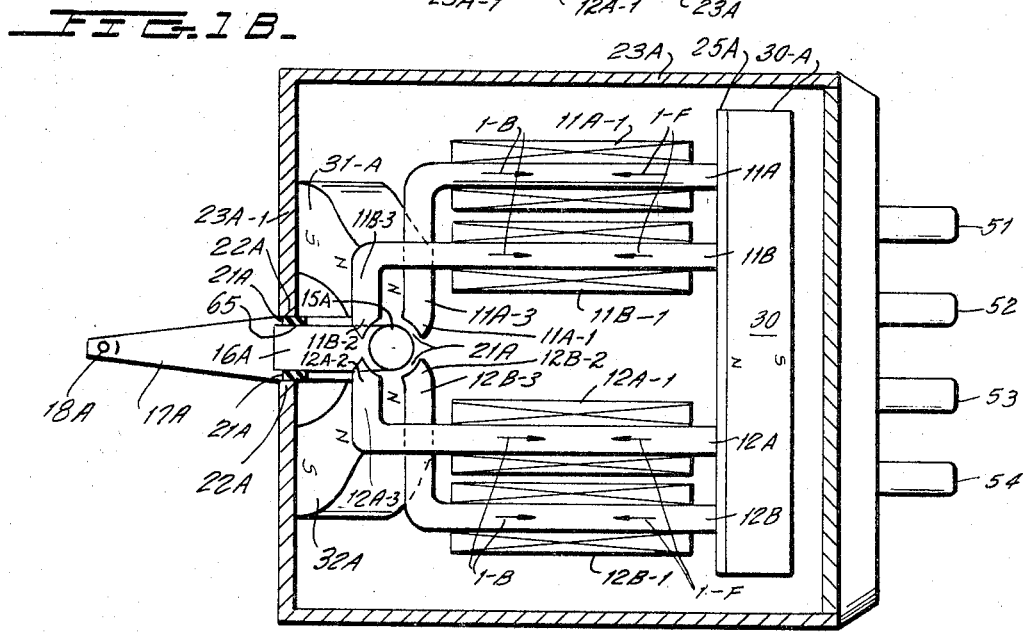
FIG. 1B is a similar diagrammatic showing the cooperation of the principal parts of one form of a stereophonic pickup of the invention, a specific example of which is shown in FIG. 1 and FIGS. 2 through 19.

Before describing in detail specific exemplifications of the invention as applied to the actual design of stereophonic pickups exemplifying the invention, the basic principles of the invention will be first described with the diagrammatic views of FIGS. 1A and 1B, showing diagrammatically the operative relation of basic operative components of a monophonic and a stereophonic pickup, respectively, exemplifying the invention.

PRINCIPLES OF MONOPHONIC PICKUP

FIG. 1A is a diagrammatic horizontal cross-sectional view of a monophonic pickup exemplifying the invention. It comprisse two permeable magnetic pole members 11A and 12A of high-mu metal, for instance, each surrounded by its winding coils 11A–1 and 12A–1 and having pole ends 11A–2, 12A–2 spaced by an air-gap 21A. Within the pole air-gap 21A is pivotally supported the rear section 15A of a high-mu armature 16A which is connected through stylus-drive rod 17A to the groove-engaging stylus 18A. The armature front section 16A is spaced by an air or non-magnetic gap 21A from the surrounding edge region 22A of a high-mu shield casing 23A, having a rear end wall 24A and enclosing the entire internal core system. To increase the signal output, a high-mu bridging junction plate 25A is affixed, as by epoxy resin, to the rear ends of the pole pieces 11A, 12A.

The magnetic shield housing 23A with its rear wall 24A surround or enclose the entire internal core system except for a front opening between the shield edge region 22A spaced by a small gap from the front section of armature 16A. As usual a permanent magnet 30A magnetized, for instance, in the manner indicated by its pole symbols N and S, is held along the rear ends of the pole pieces 11A and 12A for forcing the maximum feasible unidirected field flux 1–F through the length of the pole pieces 11A, 12A and through their pole end air gap 21A along the armature 15A. The armature 16A is shown biased to a neutral position as by a spring wire 15A–1, the rear end of which is affixed to support sleeve 24 of the stylus assembly. Stylus transmitted undulations of the armature 16A in the core air gap 21A produce corresponding undulations of the field flux in the core path of the pole pieces 11A, 12A and generation of the desired corresponding signal output.

All heretofore known electromagnetic pickups operating with a permeable armature embodies a core system with a permanent field magnet similar or analogous to that thus far described in connection with FIG. 1A, although in some of them, the permanent field magnet was made part of one of the cooperating pair of pole members. Such heretofore known electromagnetic pickups of the monophonic and stereophonic type are exemplified by those of U.S. Patents 2,511,663, 2,535,479, 2,388,116; Reiback 2,875,282, 3,067,295 and 3,015,703.

The strong permanent magnet unidirectional of field flux of such known electromagnetic pickups, even those having a high-mu magnetic shield housing, is the cause of serious difficulties and imposes design limitations. A strong magnetic leakage field flux is present in the region of the undulated armature and beyond the front shield housing opening thereby decreasing the field flux available for modulation by the armature undulation. Furthermore, external vibrations or shocks are sensed by the junction between the permanent field magnet and the core pole system, which vibrations and/or shocks are propagated along the pole pieces and cause modulation of the unidirected magnet field flux and generation of disturbing noise signals.

In practical stereophonic pickups operating with such known core systems, the permanent field magnet adjoins the rear ends of the core pole pieces 11A and 12A and their field flux has to be forced through the full length of each pole piece and through their front pole ends. The open front end of the grounded magnetic shield housing although kept small must be large enough for passage of the stylus rear end affixed to the undulated armature 15A. In actual practice with the known above-described types of core systems, the permanent field flux available at the armature 15A was limited by the fact that it was essential to prevent saturation of the rear portion of the pole pieces adjoining their coils. This pole-piece flux saturation limit fixes the maximum level of usable field flux. The signal output of the pickup is directly proportional to the field flux available at the front air gap pole ends 11A-2, 12A-2 which is modulated by the armature undulations. At the junction between the field magnet 30A and the rear ends of the pole pieces 11A, 12A, the permanent field flux has to be of maximum density. As a result, vibrations or shocks imparted to the pickup are microphonically sensed by their junction, thereby causing disturbing mechanical modulations of their high density field flux and generation of corresponding excessive noise signal output.

The present invention is based on the principle of reducing to a near zero flux state the permanent unidirectional field flux 1-F in each core-pole-piece path when the magnetic armature is held biased in its neutral position within the pole piece air gap 21A. In accordance with the invention this may be achieved by positioning in the space region between the front ends 11A-2, 11A-3 and 12A-2, 12A-3 of the two pole pieces 11A, 12A and their surrounding front shield housing section 23A-1 a balancing permanent magnet structure shown as consisting of two permanent balancing magnets 31A and 32A. The two permanent balancing magnets 31A and 32A are polarized, as shown by their N, S symbols, to produce in the core path of the two pole pieces 11A and 12A an opposite balancing unidirectional flux indicated by arrows 1B, which reduce the field flux 1-F in the two pole pieces 11A, 12A to a near zero flux state when the armature 16A is in the neutral position. The balancing permanent magnets 31A, 32A are also arranged and designed to force a very strong unidirected front core field flux flowing from their respective "N" pole faces through the two front pole ends 11A-2 and 12A-2 across the air gap 21A in a lengthwise axial direction through the armature 16A and back through the air gap 21A to the surrounding shield edge 22A and return through front shield region 23A-1 back to the outer "S" pole faces of the two magnets 31A and 32A. This unidirected front core field flux is co-directional with the unidirectional field flux 1-F that would have been produced therein by the field magnet 30A in the absence of the balancing magnetic structure.

Deflection of the armature 15A from the neutral position by a stylus undulation toward the pole face of one nearby core pole end, for instance to pole piece end 11A-2, upsets the balanced magnetic near zero flux state in the two pole pieces 11A, 12A and causes flow of a strong magnetic flux through pole piece 11A and a strong oppositely directed flux through the other pole piece 12A and generation of a corresponding signal in their windings 11A-1, 12A-1. Analogous opposite stylus imparted undulations of armature 15A from the neutral position between the pole faces of the two pole piece pole ends 11A-2, 12A-2 produces corresponding alternating magnetic flux undulations in the two pole pieces 11A and 12A and generation of corresponding alternating electric signals in their respective windings 11A-1, 12A-1. The output of two windings 11A-1, 12A-1 is supplied in aiding relation to the two exposed pickup terminals 51, 52.

Although the balancing unidirectional pole piece flux 1B could be produced by a single permanent balancing magnet, more uniform balancing of the pole piece field flux 1-F is achieved by positioning two opposite balancing permanent magnets 31A and 32A between the respective two front pole piece sections 11A-3, 12A-3 and their respective overlying shield wall regions of the front shield section 23A-1. This feature also applies to the positioning of the front balancing permanent magnet structure, such as balancing permanent magnets 31A, 32A, between the front pole piece sections of two similar sets or pairs of cooperating pole pieces 11A, 12A and 11B, 12B of a stereophonic pickup of the invention described hereinafter in connection with FIG. 1B and FIGS. 1 and 2 to 19.

In the cartridge system of FIG. 1A, the armature 16A does not carry any alternating flux except for such alternating flux passing between the two pole piece ends 11A-2, 12A-2. Accordingly, the armatures 15A, 16A need not have alternating flux permeability, but should be able to carry in longitudinal direction of its axis a high density unidirectional permanent flux without saturating the armature. For optimum efficiency, the permanent field magnet 30A and the permanent balancing magnets 31A, 32A should have low alternating flux permeability. Such permanent magnets of low alternating flux permeability may be made in a known manner of permanently magnetizable metal oxide particles, for instance of known sintered permanently magnetizable ferrite particles of high coercive force which, after being formed in the desired shape, are permanently magnetized in the required direction. Such ferrite permanent magnets have an alternating flux permeability close to that of air, i.e., 1.1. Alternatively, conventional permanent magnets 30A, 31A, 32A are separated by air gaps or non-magnetic gaps from the nearby pole piece sections and pole ends 11A-2, 11A-3, 12A-2, 12A-3 and their rear end pole faces, which air gaps provide this required low alternating flux permeability.

In electromagnetic pickups of the invention having at the front end balancing permanent magnets, the rear magnet 30A opposes and balances in each pole piece 11A, 12A to near zero the flux of the front magnets. As a result, the unidirectional flux at the junction of the rear magnet 30A and rear ends of the pole pieces 11A, 12A is near zero, minimizing microphonic sensitivity and noise output caused by similar magnet junction in prior electromagnetic pickups. In the pickups of the invention, the permanent balancing magnet structures 31A, 32A at the front end sections of the opposite pole pieces 11A, 12A supply the required unidirectional field flux to the front pole ends 11A-2, 12A-2 and to the armature 16A along its longitudinal axis, which armature flux has the same direction as the original field flux 1F. This front unidirected flux returns through the front shield region 23A-1 to the opposite as S pole faces of the two frontal balancing magnets 31A, 32A. As a result, the limitation of the signal output in prior pickups due to saturation limit at the pole piece rear ends by the unidirectional flux 1F which the rear magnet 30A had to force through the entire length of each pole piece 11A, 12A is eliminated. Accordingly, the pole-piece core system with the additional balancing magnet structure may be readily designed to deliver a higher signal output with minimized noise level.

The above described benefits will also be secured by combining similar balancing magnets with analogous modified forms of electromagnetic pickups wherein only one of the two pole pieces 11A, 12A is provided with a transducing winding and/or wherein the permanent field magnet forms one or part of one of the two pole pieces 11A, 12A or the core junction between the rear ends of the two pole pieces. The benefits of securing a near zero unidirectional flux state in the winding interlinked core-pole-piece path of the pickup of the invention described above are applicable to various other analogous prior phonograph pickups, including those described in the above identified prior U.S. patents.

STEREOPHONIC ELECTROMAGNETIC PICKUPS

Two sets of core systems of the type described above in connection with FIG. 1A may be combined into a stereophonic pickup of the invention wherein their two pairs of sets of pole pieces having two pairs of confronting pole end faces which define a common air gap, with a stylus undulated permeable armature modulating the unidirected field flux forced through each winding interlinked pole piece. Each pole piece field flux is balanced to a near zero flux state by a balancing permanent magnet structure in the neutral armature position.

FIG. 1B shows diagrammatically how two balanced pole piece core systems of the type shown in FIG. 1A may be so combined into a stereophonic pickup. The stereophonic pickup of FIG. 1B has one set of two cooperating pole pieces 11A and 12A and another set of two cooperating pole pieces 11B and 12B, each corresponding to the pole piece pair 11A, 12A of the monophonic pickup of FIG. 1A. Pole piece 11A is surrounded by a coil 11A–1 and cooperating pole piece 12A is surrounded by a coil 12A–1 with the two coils connected in aiding relation. Similarly, the two other cooperating pole pieces 11B and 12B of the other pole-piece set or pair are surrounded by corresponding coils 11B–1 and 12B–2. The two pairs of FIG. 1A. Pole piece 11A is surrounded by a coil 11A–1, 12A–1 and 12B–1, 12B–2 define a common air gap 21A analogous to that of FIG. 1A. An elongated axially extending magnetic armature 16A, similar to that of FIG. 1A, is held for pivotal undulation in a common air-gap 21A formed between confronting pole faces of the two pairs of pole piece ends 11A–3, 12A–3 and 11B–3, 12B–3 of the two cooperating pole piece pairs analogous to the single pole pair of the pickup of FIG. 1A.

A high-mu junction plate 25A is held against the rear ends of the two pairs of pole pieces 11A, 12A and 11B, 12B with a similar permanent magnet 30A held along the rear ends of the pole pieces or their pole junction plate 25A. In a manner analogous to FIG. 1A, the unidirectional field flux 1F of rear permanent magnet 30A is forced through the length of each of the two pairs of pole pieces 11A, 12A and 11B, 12B.

In accordance with the invention—when the armature is held in the neutral position—the unidirectional field flux 1F in each of these four pole pieces 11A, 12A, 11B and 12B is reduced to near zero flux state by two permanent balancing magnets 31A, 32A held, respectively, in the regions between the two pole piece front end sections 11A–3, 11B–3 and the two other opposite pole-piece front end sections 12A–3, 12B–3 and the respective nearby two surrounding shield wall sections 23A–1 in a manner analogous to the corresponding elements of the pickup shown in FIG. 1A. Thus the "N" pole surface of balancing magnet 31A is near the front pole piece sections 11A–3 and 11B–3 of the two pole pieces 11A and 11B of the two core systems and its "S" pole surface is held along the surrounding nearby shield wall section 23A–1. The other similar balancing magnet 32A is similarly positioned between the front sections 12A–3 and 12B–3 of the two other pole pieces 12A and 12B of the two core systems and the surrounding nearby shield wall section 23A–1.

All other operating features and characteristic requirements described above in connection with the monophonic pickup of FIG. 1A apply fully to the stereophonic pickup of FIG. 1B. The system of FIG. 1B differs from that of FIG. 1A only by the fact that a single set of two balancing magnets 31A, 32A is utilized to oppose the magnetomotive force applied by the rear field magnet 30A to the two adjacent pole pieces 11A, 12A and 11B, 12B of the two pairs or sets of cooperating pole pieces 11A, 12A and 11B, 12B of the diagrammatically shown stereophonic pickup. The two balancing magnets 31A and 32A also force a strong unidirectional of field flux in the same direction as the field flux 1–F of the rear magnet 30A through the similar axially extending armature along its longitudinal axis, which unidirectional armature field flux returns across the front air gap region 21A to the surrounding edge 22A of the surrounding front shield section 23A–1 returning to the "S" pole faces of the two balancing magnets 31A and 32A. Otherwise, the principles of the invention, described above in connection with FIG. 1A, govern the design and operation of the stereophonic pickup shown diagrammatically in FIG. 1B and practical constructions thereof, an example of which is shown in FIGS. 1 and 2 to 19. An example of a heretofore used design of a stereophonic pickup which constitutes the subject matter of my pending U.S. application Ser. No. 448,369, filed Aug. 15, 1965 will first be described before explaining its combination with balancing magnets and other features of the present invention.

Refer to FIGS. 1, 2 to 7 and the exploded views of FIGS. 17 to 19 showing an example of this prior used design of a stereophonic pickup 20. The pickup 20 consists of a main core assembly indicated by the bracketed elements 21 in FIG. 17 and a removable and replaceable armature stylus assembly 22 (FIGS. 6 and 18) held together by retaining collar member 23 (FIGS. 4 and 17) which frictionally engages and is retained in the surrounding stylus assembly sleeve 24. The retaining collar 23 may be formed of nylon, for instance. stance. Shield housing 25 has a bracket 26 welded to the sloping forward portion of upper bracket surface. Outwardly extending bracket wings 27 are provided with slots which receive screws for the mounting of pickup 20 to a tone arm (not shown) in a manner well known to the art. Stylus assembly retaining collar member 23 is disposed within magnetic shield housing 25 at the forward end thereof. The front end of shield housing 25 has a small shield aperture 25a aligned with the smaller opening of the stylus-assembly-retaining collar 23. Pole piece or core sub-assembly 30 (FIGS. 4, 5, 8, 9, 10, 17 and 19) is disposed entirely within shield housing 25 and has at its frontward end a molded plastic support member 31 with two forward aligning projections 31a, 31b (FIGS. 8 to 9) engaging stylus assembly retaining collar member 23. Plastic pole piece support 31 has a hollow space bore 32 extending therethrough, which bore 32 is aligned with receiving apertures 23a and 25a of retaining collar 23 and shield housing 25 so as to receive stylus assembly sleeve 24. In the form shown, the plastic support bore 32 is of cylindrical shape.

The front forward portions of four elongated rod-like pole pieces 33, 34, 35 and 36 of two core-path systems are held within aligning openings of non-magnetic pole piece and frame 37 which are totally encapsulated by plastic pole piece support 31. Prior to the encapsulation, the forward ends of pole pieces 33 through 36 are secured, as by welding, to a stiff aligning frame 37 (FIGS. 4–19) at the four arcuate pole piece seats in the corners of a generally square aperture 37a in aligning frame 37. Aligning frame 37 is shown constructed of low permeability metal such as stainless steel so that for practical purposes it will not have any magnetic influence or effect on the overall operation of the pickups. Winding coils 43, 44, 45, 46 are seated on the rearward sections of the four pole pieces 33, 34, 35, 36, respectively.

To the rearward end faces of the two cooperating pairs or sets of pole pieces 33, 35 and 34, 36 is affixed, as by epoxy cement, a transverse permeable magnetic junction plate 47 for reducing the reluctance of their respective core paths. To the rearward face of magnetic junction plate 47 is affixed, as by epoxy cement, one pole face of a permanent field magnet structure 48 which is axially magnetized in the elongated direction of the four pole pieces 33 to 36, for example, as indicated by the applied N and S symbols (FIGS. 4 and 17). The shield housing 25 is completed by a rear shield wall 50 of the same high permeability material welded thereto after placing the pole piece assembly in operative aligned position within the shield housing. The rear shield wall 50 may be spaced by an air gap from the four rearward pole piece end faces and from their rear junction plate 47 as indicated in FIGS. 1A and 1B. To the rear face of shield end wall 50 is similarly affixed a molded plastic flat terminal support having molded and affixed therein four protruding male terminals 51, 52, 53, 54 which protrude from the rear thereof. Permanent field magnet 48 is provided with notches 50a for the passage of leads (not shown) from coils 43 through 46 to terminals 51 through 54. The particular electrical connections between cooperating coil pairs 43, 45 and 44, 46 of the two cooperating pairs of pole pieces are made in a manner well known to the art and require no further description.

When viewing the pickup as seen in FIG. 4 certain elements of main pole piece and coil assembly 21 (FIG. 17) appear to be floating. These components are secured in their cooperative positions by suitable cement, such as epoxy cement.

The above described shield enclosed pole piece assembly 21 cooperates with a removable stylus-armature assembly 22. Removable stylus assembly 22 (FIGS. 4, 5, 6, 7 and 18) comprises support and assembly sleeve 24 having a wire spring 61 which acts as a cantilever support for permeable magnetic armature 62. Biasing spring 61 extends generally longitudinally of sleeve 24 and with the rear spring end 61a cemented to the inwardly extending rearward sleeve deformation 24a. Stylus 63 is mounted to the off-set front portion of tubular stylus lever 64. The rear end of stylus lever 64 has a radially inwardly deformation 64a which extends into the hollow bore space 62c of tubular elongated cylindrical armature 62. The forward biasing-spring end 61b is affixed, as by cement, to the rearward stylus lever deformation 64a held within the rearward armature bore portion. Bias spring 61, stylus lever 64 and armature support sleeve 24 are constructed of non-magnetic materials, such as brass or aluminum. In the pickup of the present invention, the armature 62 does not carry alternating flux, but is designed to carry and pass high-density unidirectional permanent flux without saturation as explained above in connection with FIGS. 1A and 1B.

In the specific example shown, the forward armature section 62a has a uniform outer cylindrical shape while the outer surface and armature of rear section 62b is tapered inwardly and rearwardly for reasons hereinafter explained. Interior armature bore 62c is of uniform cylindrical diameter throughout its length so that the wall thickness of armature 62 is tapered at the rear section 62b. Elastomeric damping and pivot support ring 65 surrounds armature 62 and grips its cylindrical exterior surface while its outer cylindrical surface is in firm engagement with the surrounding section of the armature support sleeve 24.

Referring to FIGS. 4, 6 and 18, the front region of armature support sleeve 24 with its flaring front end is held embedded and affixed within a molded plastic grip member 66 having a downwardly facing channel or recess 66a. Stylus lever 64 extends through plastic grip recess 66a and exposes its stylus 63 into undulatory engagement with the record groove and the record undulations of its two groove segments.

As seen in FIGS. 4, 6, 17 and 18, stylus-armature assembly sleeve 34 is held within bore 32 of plastic pole piece support 30 and within its pole-face air gap. However, the friction fit between retainer sleeve 34 and the wall defining bore 32 is not relied upon for securing stylus assembly 22 to main assembly 21. Instead the metallic cartridge bracket 26 (FIG. 4) is provided with forwardly extending downward aligning and retaining projection 26a which is force fitted into rectangular notch 66a of plastic stylus holder bridge 66. Bracket projection 26a and retainer notch 66a of plastic pole-piece support 30 cooperate to correctly position and align the stylus 63 and its armature 62 with respect to pole pieces 33 through 36.

With stylus armature support sleeve 24 so mounted within main transducer assembly 21, the shield housing 25 has a front shield edge section 25a defining a shield opening spaced by the non-magnetic gap space of the elastomer body 65 and surrounding portion of support sleeve 24 from the cylindrical front armature section 62a. This mounting of the stylus armature support sleeve 65 also supports the rearward tapered armature section 62b for pivotal stylus-imparted undulation between confronting front pole faces of the two pairs of cooperating pole pieces 33, 35 and 34, 36. The rearward permanent magnet 40 forces a unidirectional field flux 1–F in axial direction lengthwise through each of the four pole pieces 33 to 36 which passes across the air gap 21A and thence axially lengthwise through the armature sections 62b and 62 back across the air gap 21A to surrounding shield opening edge 25a and returning through the shield housing to rearward face of permanent field magnet 48.

The armatures 62, 62b carry the unidirectional field flux from the four surrounding pole-piece faces along its axial longitudinal direction (FIG. 16, arrows 3f, 4f). This unidirectional flux returns from frontward armature section 62 across the air gap to surrounding shield housing edge 25a and thence in direction of arrow 5f through the length of the shield housing 25 and its rear wall 50 to the rear pole face of permanent field magnet 48. Each of the two transverse components of each stylus imparted armature undulations between the two pairs of respective confronting pole faces causes the rearward armature section to correspondingly modulate the field flux in each of the respective two pole piece pairs 33, 35 and 34, 36, generating in their respective two sets of windings 43, 45 and 44, 46 two signal sequences corresponding to the two undulation sequences of the record groove.

Pickup 20 is thus constructed to reproduce stereophonic recordings made by the Westrex 45—45 system. Pole pieces 33 and 35 are in the magnetic core circuit or path of one play-back channel while pole pieces 34 and 36 are in the magnetic core circuit of the other playback channel. The air gap distance (radial spacing) between the arcuate pole faces of pole piece pair 33 and 35 is equal to the gap distance between the arcuate pole faces of the other pole piece pair 34 and 36. Further, the air gap length (measured along the axis of armature 62) is the same for the air gaps between the pole faces of pole-piece pair 33 and 35 as the air gap length between the pole faces of pole-piece pair 34 and 36. These gaps occupy the same axial position and they are coextensive and common to both reproduction channels.

In accordance with the invention of copending application Ser. No. 448,369, filed Aug. 15, 1965, by controlling the rate of taper at tapered rear armature section 62b linearity of response is controlled. Further, by placing the biasing spring support for armature 62 substantially along the longitudinal armature axis thereof at a point considerably forward of the armature rear end, further increase in response linearity and in armature compliance is secured.

In the stereophonic pickup of FIGS. 4 to 19, the four gap confronting pole faces of all four pole pieces 33 to 36 have coaxial cylindrical arcuate pole faces defining between them a cylindrical air gap. The pole pieces 33–36 may be individually shaped with such cylindrical pole faces. The cylindrical alignment of the four pole faces is readily achieved by forming them subsequent to mounting or securing of pole pieces 33 through 36 in then aligned positions aligning metal frame 37 and thereafter giving them the cylindrical pole faces with a circular drill. This drilling operation may take place either prior or subsequent to embedding the pole pieces 33–36 in their plastic support 31.

It is noted that the term "magnetic gap" as used herein in the specification and claims means or refers to a portion of a magnetic circuit having relatively low magnetic permeability even though such "magnetic gap" may be occupied by a solid non-magnetic substance rather than air.

The thus far described design features of the practical pickup shown in FIGS. 4 to 19 correspond to those of hereinabove identified prior application Ser. No. 448,369. Its winding interlinked pole pieces 33 and 36 are traversed only by the unidirectional field flux of the rear permanent magnet 48. It is accordingly subject to the limitations outlined above including excessive leakage flux, limited flux density to avoid saturation of the rearward pole-piece sections, excessive microphonic sensitivity at the junction of rearward permanent magnet 48 to the rear end faces of the four pole pieces 33 to 36 and the resulting reduced signal outputs.

The invention overcomes these limitations by combining with the stereophonic pickup of FIGS. 4 to 19 a balancing permanent magnet structure which reduces to near zero flux state the unidirectional field flux produced in the four pole pieces 33 to 36 by the rear permanent magnet structure 48 as explained above in connection with the stereophonic pickup of FIG. 1B. Thus, in accordance with the invention, while the elongated armature 62 remains stationary in its neutral position, a balancing permanent magnet structure 31A, 32A is placed in the spaces interposed between each of the two pairs of pole-piece front sections 31–1, 36–1 and 34–1, 35–1 and the overlying shield-housing front sections 25–1 which balancing magnets 31A, 32A forces through the length of each of the four pole pieces 33, 35 and 34, 36 a balancing unidirectional flux indicated by arrows 1B in FIG. 17 which is opposite to and reduces to near zero flux state the unidirectional field flux of arrows 1F produced by rearward permanent field magnet 48 in each of the four pole pieces 33 to 36.

Figure 4A:
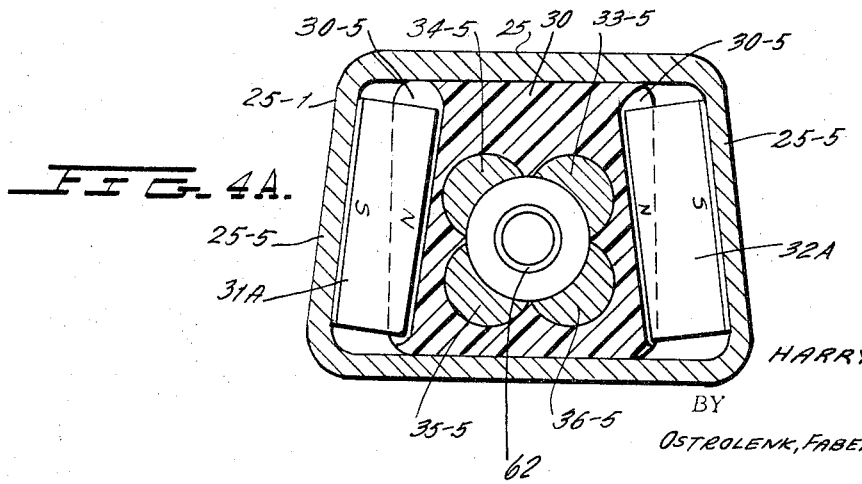
FIG. 4A is a greatly enlarged cross-sectional view of the same pickup along arrows 4A—4A of FIG. 4.

As indicated in cross-section view of FIG. 4A and FIGS. 17 and 19 and to some extent in FIGS. 1, 2, 3, 4, 8, 9, 11 and 16A, good results are secured by positioning two generally flat balancing permanent magnets 31A, 32A, generally extending with their major planes toward the record surface and magnetized as indicated by N–S symbols—along opposite sides of each two oppositely disposed nearby front pole-piece sections 33–5, 36–5 and 34–5, 35–5 and their two respective surrounding front-shield-wall sections 25–5. Cross-section FIG. 4A shows the positioning of the two opposite balancing magnets 31A, 32A between each of the two opposite superposed nearby front pole sections 33–5, 36–5 and 34–5, 35–5 and the respective two overlying front-shield-wall sections 25–5. The two opposite front balancing permanent magnets 31A, 32A have the front edges of their inwardly facing pole face aligned with the front edges of the gap facing pole end pole faces of the four pole pieces 33 to 36.

In addition to reducing to near zero flux state the unidirectional field flux 1F of the four pole pieces 33 to 36, with the armature 62 held stationary in the neutral position, the front permanent magnet structure or the two front magnets 31A and 32A are designed to have a magnetomotive force great enough to force a unidirected front-core field flux flowing from their respective N pole faces across the air gaps through the entire axial length of the armature 62 and back across the air gap to surrounding shield opening edge 25a (FIG. 16A) and return through the front shield section 25–4 back to the opposite S pole face of the respective front magnets 31A, 32A. This unidirected permanent field flux is codirectional or flows through the length of armature 62 in the same IF direction as the field flux forced through the length of the four pole pieces 33 to 36 in the absence of the balancing magnets 31A, 32A. Stylus imparted components of undulation deflection of the armature 62 from the neutral position along the two respective transverse armature gap paths between each of the opposite pole faces of each respective cooperating pair of pole pieces 33, 35 or 34, 36 upsets the near zero flux state within the respective pole pair and causes flow of strong alternating flux undulations in the core path of the respective cooperating pole pairs 33, 35 and 34, 36. The resulting strong alternating flux undulations in each of the respective cooperating pole pair generates in their respective pairs of cooperating windings 43, 45 and 44, 46 two distinct signal sequences which correspond to the two distinct stylus engaging undulation sequences on the different faces of the record groove. Because of the cooperative action of the frontal balancing magnets 31A, 32A, the stereophonic pickup of FIGS. 1 and 2 to 19 overcomes the limitation of generally similar or analogous prior pickups lacking such balancing magnets as explained above in connection with FIGS. 1A and 1B.

The plastic pole piece support 30 is recessed on its opposite side faces to provide space for positioning the two opposite balancing magnets 31A, 32A along the front end of the pole piece assembly as shown. The above described specific examples of phonograph pickups based on the principles of the invention will suggest various modifications thereof.

FIGS. 20 to 21 (corresponding in general to FIGS. 4, 4A and 1B) show a modified form of stereophonic pickup 60 of the invention and its diagramamtic view of FIG 1B. The pickup 60 is generally similar and combines generally the same components as the pickup 20 of FIGS. 1 and 2 to 19 and of diagrammatic view FIG.1B except for the differences explained below.

The core system of pickup 60 has two distinct stereophonic core paths, each having its respective distinct pole-piece 35–4, 36–4 with its own respective surrounding winding coil 45–4, 46–4. The two winding-interlinked distinct pole pieces 35–4 and 36–4 cooperate with a common third core pole piece 33–4 which does not have any windings. Distinct pole piece 35–4 with its winding 45–4 forms with common pole piece 33–4 one distinct stereophonic core path for generating in its distinct winding 45–4 one distinct stylus-traced record channel signal output in a manner analogous to the distinct cooperating pole-piece pair 11A, 12A of the stereophonic pickup seen in FIG. 1B and corresponding elements of FIGS. 2 to 19. Distinct pole piece 36–4 forms with common pole piece 35–4 the opposite distinct stereophonic pole-piece record path for generating in its own distinct pole-piece winding 46–4 the opposite distinct stylus traced record channel undulation—in a manner analogous to the other distinct cooperating pair of pole pieces 11B, 12B of the stereophonic pickup seen in FIG. 1B and corresponding elements of FIGS. 2 to 19.

The distinct front-pole-piece sections 35–5, 36–5 and common-front-pole-piece section 33–5 of the three pole pieces 35–4, 36–4 and 33–4 terminate in three pole ends 35–6, 36–6 and 33–6 having respective three pole faces angularly disposed relatively to each other and defining a common air gap 21–A corresponding to common air gap 21A of FIG. 1B and in the pickup of FIGS. 2 to 19. A similar shield housing encolsure 25 encloses the entire magnetic core system with it pole pieces, except for a small front shield opening aligned with the common pole-piece air gap similar to the pickup of FIGS. 1B and 2 to 19. The three pole-piece front sections 35–5, 36–5 and 33–5 are affixed in their operatively aligned positions within a plastic support 30–4 corresponding to common plastic pole-piece support 30 shown in FIGS. 4, 4A, 8, 9, 17 and 19. A rear permanent magnet 48 forces a unidirected field flux 1F lengthwise through each of the three pole pieces 35–4, 34–4, 33–4 and their common air gap 21A and the stylus-undulated armature 62 held biased to a neutral air gap position. The front end of the longitudinal armature 62 is spaced from surrounded front-shield-opening edge 25a by an air gap 21A. The shield housing 25 provides a return path for the unidirectional field flux from the front ends of the three pole pieces 35–4, 36–4, 33–4 rearwardly along the length of shield housing 25 back to S pole face of field magnet.

A pickup 60 of the type shown in FIGS. 20 to 21 which lacks a balancing permanent magnet structure is subject to the limitations and difficulties encountered with analogous prior pickup set forth hereinabove. These limitations and difficulties are overcome by a frontal balancing permanent magnet structure of the invention. Good results are secured by placing in the two side spaces between the opposite outer sides of the three front-piece-sections 35–5, 36–5, 33–5 including their front pole ends and their overlying surrounding two shield wall sections 25–5 (FIG. 21) two permanent balancing magnets shown 31A, 32A polarized by N–S symbols which force through the length of each of the pole pieces 35–5, 36–5, 33–5, a balancing flux 1B opposing and reducing the field flux 1F to a near zero flux state while the armature 62 remains in its neutral position. As in the previous examples, stylus-imparted undulation components from the neutral position along each of two distinct transverse air-gap paths in planes generally perpendicular to the center of each distinct pole face of each respective distinct pole piece 35–4, 36–4 will upset their respective near zero flux state and cause corresponding alternating undulations of their flux and generation of corresponding distinct signal sequences in their respective distinct windings 45–4, 46–4.

As in the previous example, the frontal balancing magnets 31A, 32A force through the armature 62 in the direction of its longitudinal axis a unidirectional flux codirectional with rear magnet field flux 1F which returns across the front-shield-edge air gap into the frontal shield sections 25–4 and thence to the S pole face of the respective balancing magnets 31A, 32A.

In practical embodiments of the invention, the balancing magnets are secured in their proper operative positions relatively to the other cooperating pickup parts by affixing their outward pole faces to the overlying shield wall section of the shield housing. In the example of the pickup shown in FIGS. 1 and 2 to 19, the two balancing magnets 31A, 32A have their outer pole faces affixed with epoxy cement to the adjacent inward surface of the respective overlying shield wall sections 25–5 of the shield housing 25 (FIG. 4A). The pole piece assembly with its plastic frustoconical front support 31 is thereafter inserted into its operative position within the respective shield housing 25 through its open rear end, as described before in connection with FIGS. 2 to 17. In the pickup example of the invention shown in FIGS. 20 to 21, its two balancing magnets 31A and 32A have their outer S pole surfaces similarly affixed to their respective adjacent shield wall sections 25–5 (FIG. 21).

In the practical embodiments of the invention, such as in the example of the stereophonic pickup shown in FIGS. 2 to 19, proper cooperative positioning of the balancing magnets relatively to the other cooperating parts of the pickup is secured by affixing their outer pole surfaces—such as the S pole surfaces of the example—to the facing inward surface of sections 25–5, for instance, with epoxy resin.

The principles underlying the invention described in connection with specific exemplifications will suggest other modifications and applications thereof.

What is claimed is:

1. In an electromagnetic pickup for playing back two distinct undulations from two distinct segments of a stereophonic-type record groove,
a support,
a magnetic core structure held by said support including two core sets each having two cooperating pole members, each set of two pole members having two pole ends with two spaced apart confronting pole faces and constituting a distinct pole-piece core path with the two sets of confronting pole faces defining a common air gap,
at least one set of windings interlinked with each core set,
said core structure also including a permanent field magnet forcing a distinct unidirected field flux through each distinct core path of each pole member and their pole face air gap,
a stylus held to be moved by said two distinct groove undulations,
an armature connected to said stylus and biased to a neutral position and caused to be undulated by each of said distinct stylus undulations from said neutral position along each of the respective corresponding distinct air gap paths between said confronting pole faces and cause corresponding field-flux undulations along each of said set of two pole members and generation of corresponding distinct signal sequences in their respective set of windings,
a permeable magnetic shield surrounding at least part of said core structure including the regions of said pole member ends and their said common air gap and spaced apart from at least the outer side regions of said distinct pole ends,
two adjacent pole members one from each of said two pole member sets being laterally spaced from the two other adjacent pole members,
and at least one balancing permanent magnet held between the said outer side regions of each two adjacent pole-member ends of each of said two adjacent pole members and the respective two surrounding portion of said shield and forcing through each of said two sets of two pole members a balancing flux opposing and reducing to a balanced near zero flux state the field flux in each of said two sets of pole members in the neutral position of said armature,
undulations of said armature from said neutral position along each of said distinct air-gap path upsetting said balanced near zero flux state in each of said two pole-member sets,
and causing corresponding alternating flux undulations in and generation of distinct corresponding signals in the windings of each of the so affected set of pole members.

2. In a phonograph pickup as claimed in claim 1,
said shield having an opening with a surrounding shield edge,
said armature having a rear armature portion held in the region of said pole-face common air gap and an axially spaced front armature portion held near and spaced by a shield gap from the region of said shield edge,
said two balancing magnets also forcing a unidirected front flux through a path including the axial armature length from said armature rear portion to said armature front portion and through said shield edge region, said unidirected armature front flux being codirectional with said unidirected field flux of said pole pieces.

3. In a phonograph pickup as claimed in claim 2,
the two core sets and their respective windings being balanced relatively to each other for reproducing the two distinct undulations with comparable characteristics.

4. In a phonograph pickup as claimed in claim 2,
said permanent magnets having low permeability for passage of alternating flux.

5. In an electromagnetic pickup for playing back two distinct undulations from two distinct segments of a stereophonic-type record groove,
a support,
a magnetic core structure held by said support and forming two at least partially distinct magnetic core paths including a common air gap,
each distinct core path including a distinct pole member having a pole end with a distinct pole face and at least one further cooperating pole member having a pole end with a further pole face, said different distinct pole faces and said further pole faces being angularly disposed relatively to each other and being spaced apart and defining said common air gap.
each distinct pole face and a facing cooperating further pole face being spaced apart and constituting parts of two distinct core paths, respectively, each including a different of said two distinct pole members, and the spaced apart pole faces of each said distinct core paths defining two distinct air gap paths extending transversely to the respective two distinct pole faces,
distinct windings around each and responding to flux undulations in the respective said two distinct pole member core paths, said core structure including a permanent field magnet structure forcing a distinct unidirected field flux through each of said pole members and through said air gap, a stylus held to be moved by said two distinct groove undulations, an armature connected to said stylus and held biased to a neutral position in said air gap and caused to be undulated by each of said distinct stylus undulations from said neutral position in a direction along each of the respective corresponding distinct air gap paths and cause corresponding field flux fluctuations of said field flux along the respective two distinct pole members and generation of corresponding signals in their said corresponding respective distinct windings, said two distinct pole members being laterally displaced from each other, a permeable magnetic shield surrounding at least parts of said core structure including the outer side regions of said pole ends and their said common air gap and spaced apart at least from said outer side region of said distinct pole ends, and at least one balancing permanent magnet structure held between said outside side regions of each of said distinct pole ends and the surrounding portions of said shield and forcing through each of said distinct pole members a balancing flux opposing and reducing to a balanced near zero flux state each of said unidirected field flux in at least each of said distinct pole members in said neutral armature position, undulations of said armature from said neutral position along each of said distinct air gap paths upsetting said balanced near zero flux state in each of said distinct pole members and causing corresponding alternating flux undulations in each of the so affected distinct pole members and generation of corresponding distinct signal sequences in the windings of each of the so affected distinct pole members.

6. In a phonograph pickup as claimed in claim 1, said shield having an opening with a surrounding shield edge said armature having a rear armature portion held in the region of said pole-face common air gap and an axially spaced front armature portion held near the region of said shield edge, said balancing structure comprising two balancing magnets, each disposed respectively between opposite side regions of each distinct pole end and of said further pole member, each of said balancing magnets also forcing a unidirected front flux through a path including the axial armature length from said armature rear portion to said armature front portion and through said shield edge region, said unidirected armature front flux being codirectional with said unidirected field flux of said pole pieces.

7. In a phonograph pickup as claimed in claim 2, each said two distinct pole members with their respective windings and core path balanced relatively to the other for reproducing the two distinct undulations with comparable characteristics.

8. In a phonograph pickup as claimed in claim 6, said permanent magnets having low permeability for passage of alternating flux.

9. In an electromagnetic phonograph pickup, a support, a magnetic core structure held by said support and forming a magnetic core path comprising two adjacent cooperating permeable pole members having two pole ends with two spaced apart cooperating pole faces defining an air gap, windings on each pole member, an armature and biasing means holding said armature in a neutral position in said air gap, a stylus connected to and transmitting record-groove undulations to said armature, said core structure including a permanent field magnet structure forcing a unidirected field flux through each of said pole members and said air gap and causing undulations of said armature from said neutral position to correspondingly undulate said pole-member field flux and generate corresponding signals in each of said windings, a permeable magnetic shield surrounding at least parts of said core structure including the regions near said two pole ends along said air gap and spaced apart from said two pole ends, and at least two opposite balancing magnets held between the exterior side region near the pole ends of said two pole members and the respective opposite surrounding portions of said shield and forcing through each pole member a balancing flux opposing and reducing said field flux in each of said two pole members to a balanced near zero flux state in said neutral armature position, undulations of said armature from said neutral position upsetting said balance flux state in each of said pole members and causing corresponding alternating flux undulations in each of said pole members and generation of corresponding signals in then said respective windings.

10. In a phonograph pickup as claimed in claim 9, said shield having an opening with a surrounding shield edge said armature having a rear armature portion held in the region of said pole-face air gap and an axially spaced front armature portion held near and spaced by an air gap from the region of said shield edge, said two balancing magnets also forcing unidirected front flux through a path including the axial armature length from said armature rear portion to said armature front portion and through said shield edge region, said unidirected armature front flux being codirectional with said unidirected field flux of said pole pieces.

11. In a phonograph pickup as claimed in claim 10, the core path and windings of each pole member being balanced relatively to the other in their overall operating characteristics.

12. In an electromagnetic phonograph pickup, a support, a magnetic core structure held by said support and forming a magnetic core path including at least one permeable pole member having a pole end with a pole face separated by an air gap from a pole face of a cooperating other pole end of said core structure, windings interlinked with said pole member, a permeable armature and biasing means holding said armature in a neutral position in the region of said air gap, a stylus connected to and transmitting record-groove undulations to said armature, said core structure including a permanent field magnet structure forcing a unidirected field flux through each said pole member of said core structure and causing undulations of said armature from said neutral position to correspondingly undulate said path field flux in the respective pole member and generate corresponding signals in the windings of the respective pole member, a permeable magnetic housing shield surrounding at least parts of said core structure including the regions near said pole ends along said air gap and spaced apart from at least the outer side regions of said two pole ends, and at least one balancing magnet structure held between said outer pole-end side regions and the surrounding portions of said shield and forcing through said core pole members a balancing flux opposing and reducing said pole member field flux to a balanced near zero flux state in said neutral armature position, undulations of said armature from said neutral position upsetting said balanced flux state in said pole members and causing corresponding alternating flux undulations in said pole members and generation of corresponding signals in said windings.

References Cited

UNITED STATES PATENTS

| | | | |
|---|---|---|---|
| 2,875,282 | 2/1959 | Reiback | 179—100.41 |
| 2,864,897 | 12/1958 | Kaar | 179—100.41 |
| 3,015,703 | 1/1962 | Pritchard | 179—100.41 |
| 3,013,126 | 12/1961 | Freise | 179—100.41 |
| 3,151,221 | 9/1964 | Pyke | 179—100.41 |
| 3,184,555 | 5/1965 | Marshall | 179—100.41 |
| 3,067,295 | 12/1962 | Stanton | 179—100.41 |
| 3,146,319 | 8/1964 | Stanton | 179—100.41 |
| 3,297,831 | 1/1967 | Stanton | 179—100.41 |

BERNARD KONICK, *Primary Examiner.*

RAYMOND F. CARDILLO, JR., *Assistant Examiner.*